US007170815B2

United States Patent
Kang (10) Patent No.: US 7,170,815 B2
(45) Date of Patent: Jan. 30, 2007

(54) MEMORY APPARATUS HAVING MULTI-PORT ARCHITECTURE FOR SUPPORTING MULTI PROCESSOR

(75) Inventor: Hee Bok Kang, Daejeon (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 93 days.

(21) Appl. No.: 10/879,274

(22) Filed: Jun. 30, 2004

(65) Prior Publication Data

US 2005/0138269 A1 Jun. 23, 2005

(30) Foreign Application Priority Data

Dec. 22, 2003 (KR) .................... 10-2003-0094567

(51) Int. Cl.
*G11C 8/00* (2006.01)
*G11C 7/10* (2006.01)
(52) U.S. Cl. ................ 365/230.05; 365/189.03; 710/100
(58) Field of Classification Search ................ 710/100; 365/189.03, 230.05
See application file for complete search history.

(56) References Cited

U.S. PATENT DOCUMENTS 5,900,008 A * 5/1999 Akao et al. ................ 711/100
6,240,007 B1 * 5/2001 Kang .......................... 365/145
6,272,594 B1   8/2001 Gupta et al.
6,363,439 B1   3/2002 Battles et al.
2004/0210729 A1 * 10/2004 Horii et al. ................ 711/156

FOREIGN PATENT DOCUMENTS

JP    06-075856    3/1994

* cited by examiner

Primary Examiner—Amir Zarabian
Assistant Examiner—Kretelia Graham
(74) Attorney, Agent, or Firm—Heller Ehrman LLP (57) ABSTRACT

A memory apparatus for supporting a multiprocessor function enables data of different characteristics to be stored in one memory, thereby reducing the area of on the system board and decreasing delay margins on the data bus. The memory apparatus has an instruction memory unit arranged to be included in one memory chip and at least one data memory unit. The instruction memory unit includes cell array blocks having nonvolatile ferroelectric c stores instruction information required for operating a central processing unit of a system. The data memory unit is connected to the central processing unit by a data bus and is provided with cell array blocks having nonvolatile ferroelectric capacitors and stores execution data required for the execution of the instruction information.

3 Claims, 14 Drawing Sheets

SUB CELL ARRAY
SCA(0)

.
.
.
.
.

SUB CELL ARRAY
SCA(n)

MEMORY APPARATUS HAVING MULTI-PORT ARCHITECTURE FOR SUPPORTING MULTI PROCESSOR

BACKGROUND OF THE INVENTION

1. Field of the Invention

The present invention relates to a memory apparatus for supporting a multi-processor function, and more particularly, to a memory apparatus which overcomes the problems such as an increase in the area of a system board and a signal delay by constructing an instruction memory storing the instruction information required for system operation and a data memory storing data (hereinafter, 'execution data') required for the execution of an instruction in a single memory chip.

2. Description of the Background Art

With the complexity of systems and the improvement of their functions and performances, central processing units (hereinafter, 'CPU') having multi-data ports have appeared.

In order to realize a memory required for the specification of such a CPU, a data port structure being adaptable well to the structure of the CPU is needed.

Conventional memory apparatuses have restricted characteristics for each individual memory type. Thus, to construct a system by matching a CPU having multi-data ports with a memory, after a plurality of memory apparatuses having different characteristics are provided separately, each of the memory apparatuses should be connected in accordance with multi-data ports of the CPU.

Figure 1:
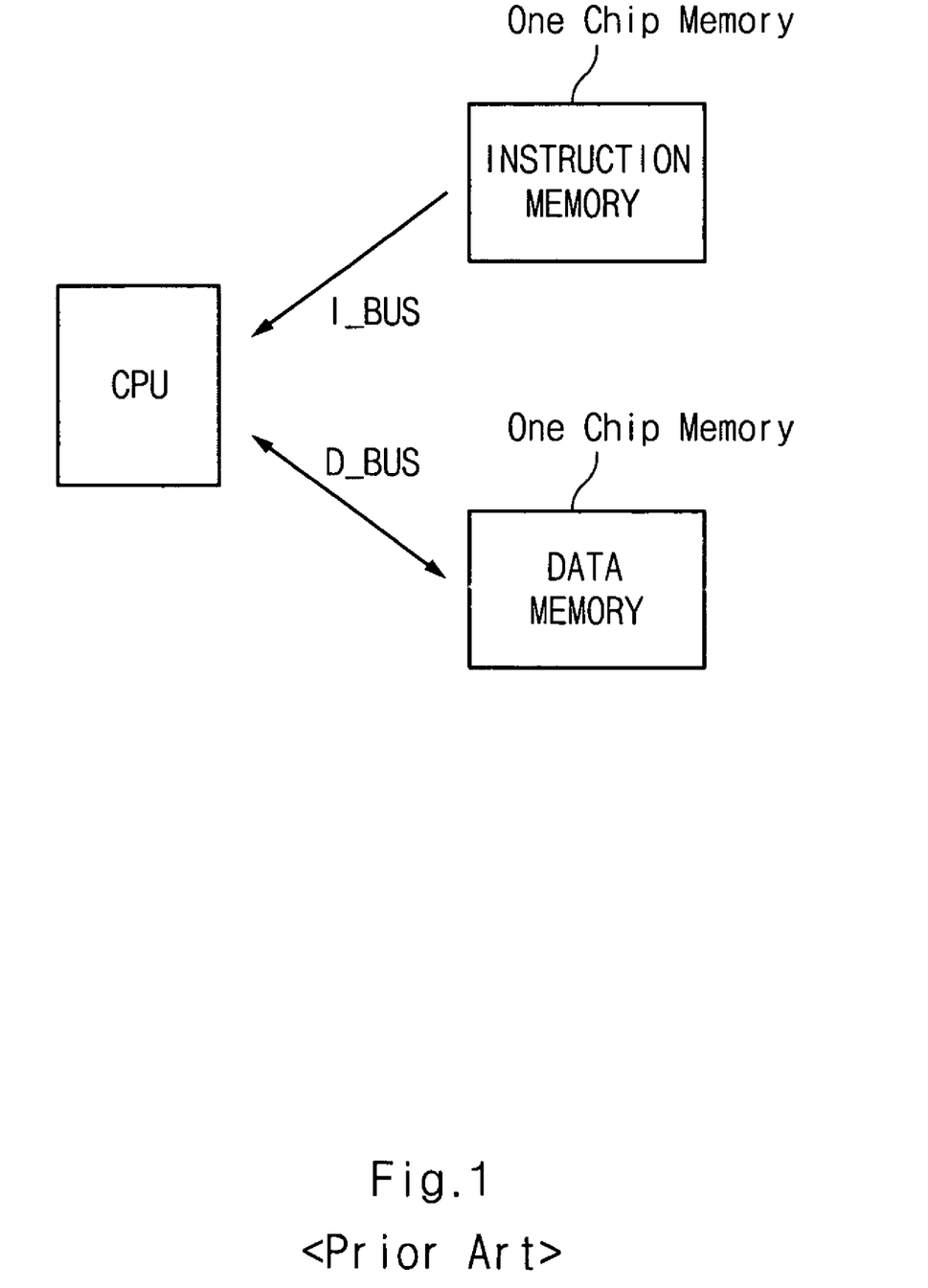
FIG. 1 is a system configuration view briefly showing the structure of a system using two memory apparatuses having different characteristics in the conventional art.

FIG. 1 is a system configuration view briefly showing the structure of a system using two memory apparatuses having different characteristics in the conventional art.

The system of FIG. 1 includes a CPU having multi-ports, an instruction memory storing instruction information and a data memory storing execution data.

At this time, the instruction memory and the data memory are separately constructed. And, they are connected to the CPU via an instruction bus and a data bus respectively.

However, as shown in FIG. 1, when the system is provided with memories having different characteristics, the area of a system board is increased and a delay margin on the data bus is reduced, thereby degrading the performance of the system.

SUMMARY OF THE INVENTION

Therefore, an object of the present invention is to improve the performance of a system by providing memories having different characteristics in a single memory apparatus with the enhancement of the structure of the memory apparatus.

To achieve these and other advantages and in accordance with the purpose of the present invention, as embodied and broadly described herein, there is provided a memory apparatus for supporting a multiprocessor function, comprising: an instruction memory unit provided with cell array blocks having nonvolatile ferroelectric capacitors for storing the instruction information required for the operation of a central processing unit of a system and connected to the central processing unit by an instruction bus for providing the instruction information to the central processing unit; and at least one data memory unit provided with cell array blocks having nonvolatile ferroelectric capacitors for storing the execution data required for the execution of the instruction information and connected to the central processing unit by a data bus for reading/writing the execution data, the instruction memory unit and the at least one data memory unit all being included in one memory chip.

In another aspect of the present invention, there is provided a memory apparatus for supporting a multiprocessor function, comprising: a first interface unit connected to a central processing unit of a system by an instruction bus and for inputting and outputting the instruction information required for the operation of the central processing unit; at least one second interface unit connected to the central processing unit of the system by a data bus and for inputting and outputting a data address signal and the execution data required for the execution of the instruction information; and a merged storage unit storing the instruction information and the execution data separately in the same cell array block and being selectively connected to either the first interface unit or the second interface unit according to the characteristics of the stored data for reading/writing the instruction information and the execution data, the first interface unit, the second interface unit and the merged storage unit all being included in one memory chip.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Hereinafter, preferred embodiments of the present invention will be described in more detail with reference to the accompanying drawings.

Figure 2:
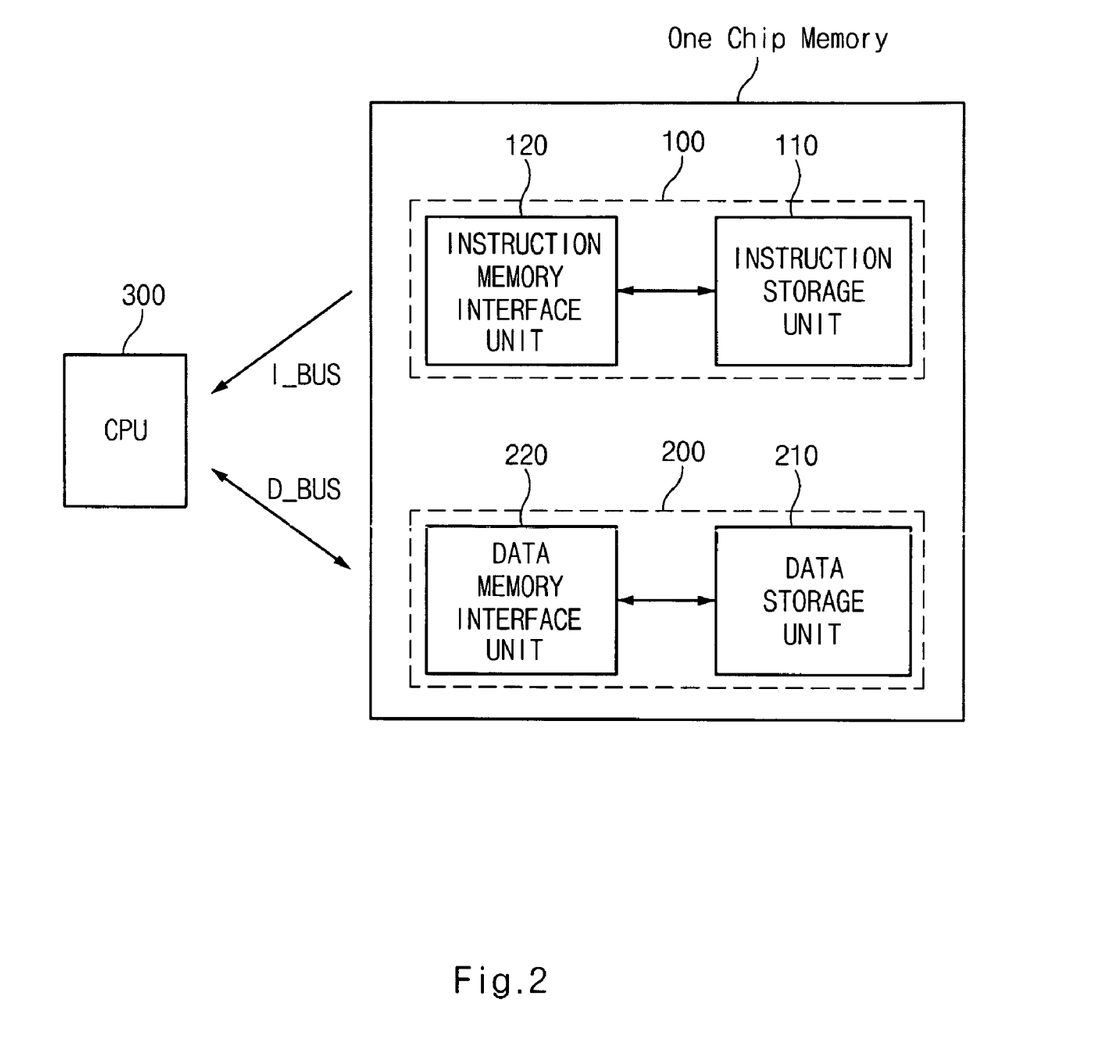
FIG. 2 is a block diagram briefly showing the configuration of a memory apparatus having a two-port structure in accordance with a first embodiment of the present invention.

FIG. 2 is a block diagram briefly showing the configuration of a memory apparatus having a two-port structure in accordance with a first embodiment of the present invention.

The memory apparatus of FIG. 2 includes an instruction memory unit 100 and a data memory unit 200. That is, the functions of a plurality of memory apparatuses 100 and 200 having different characteristics are each implemented independently in a single memory apparatus.

The instruction memory unit 100 stores the instruction information required for system operation and transmits the stored instruction information to a CPU 300 according to an externally applied instruction address signal. Such an instruction memory unit 100 includes an instruction storage unit 110 and an instruction memory interface unit 120.

The instruction storage unit 110 is provided with cell arrays having nonvolatile ferroelectric capacitors. The instruction storage unit 110 stores the instruction information required for system operation in the cell arrays according to an externally applied instruction address signal and senses the stored instruction information to output them to the instruction memory interface unit 120. The instruction memory interface unit 120 receives an instruction address signal externally applied and transmits the instruction information outputted from the instruction storage unit 110 to an instruction bus I_BUS.

The data memory unit 200 stores the execution data required for the execution of an instruction, stores the execution data to the CPU according to an externally applied data address signal and is supplied with the data generated through the instruction execution from the CPU and stores them. Such a data memory unit 200 includes a data storage unit 210 and a data memory interface unit 220.

The data storage unit 210 is provided with cell arrays having nonvolatile ferroelectric capacitors. The data storage unit 210 stores the execution data applied through the data memory interface unit 220 according to an externally applied data address signal and senses the stored execution data to output them to the data memory interface unit 220. The data memory interface unit 220 receives a data address signal externally applied and connects the data storage unit 210 and a data bus D_BUS to transmit read data and write data.

Figure 3:
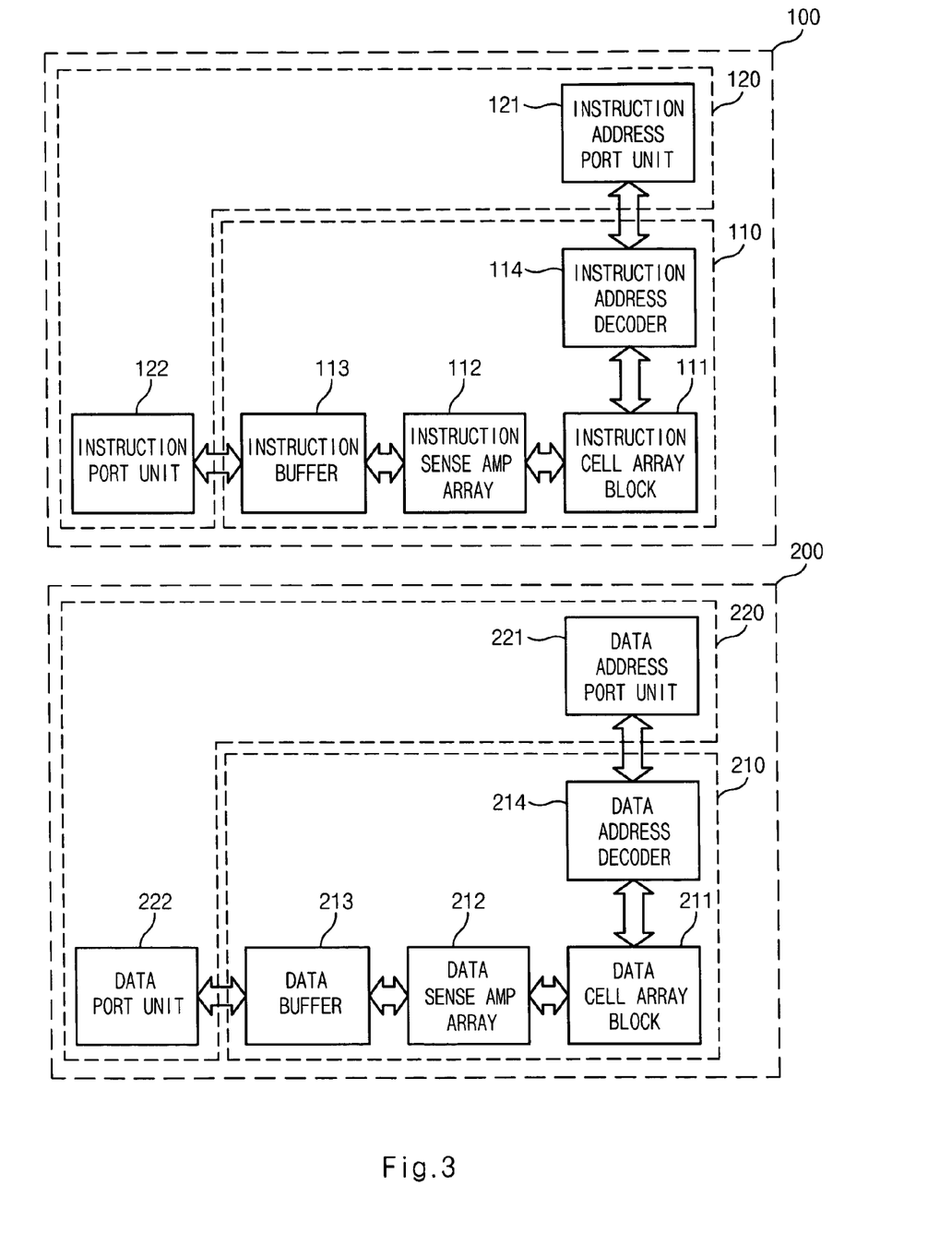
FIG. 3 is a block diagram showing the configuration of the memory apparatus of FIG. 2 in more detail.

FIG. 3 is a block diagram showing the configuration of the memory apparatus of FIG. 2 in more detail.

The instruction storage unit 110 includes an instruction cell array block 111, an instruction sensing amplifier array 112, an instruction buffer 113 and an instruction address decoder 114.

The instruction cell array block 111 is provided with cell arrays having nonvolatile ferroelectric capacitors and stores instruction information defined for the execution of the operation of the CPU. The instruction sensing amplifier array 112 senses and amplifies the instruction information stored in the instruction cell array block 111 to output them to the instruction buffer 113. The instruction buffer 113 temporally stores the instruction information sensed in the instruction sensing amplifier array 112 and then outputs them to the instruction memory interface unit 120. The instruction address signal decoder 114 decodes an instruction address signal applied through the instruction memory interface unit 120.

The instruction memory interface unit 120 includes an instruction address port unit 121 receiving an instruction address signal and an instruction port unit 122 interfacing with the instruction bus I_BUS and transmitting the instruction information stored in the instruction buffer 113 to the instruction bus I_BUS.

The data storage unit 210 includes a data cell array block 211, a data sensing amplifier array 212, a data buffer 213 and a data address decoder 214.

The data cell array block 211 is provided with cell arrays having nonvolatile ferroelectric capacitors to store execution data for the execution of an instruction of the instruction memory 212. The data sensing amplifier array 212 senses and amplifies the execution data stored in the data cell array block 211 according to a data address signal and output them to the data buffer 212. The data buffer 213 temporally stores the execution data sensed in the data sensing amplifier array 212 and then outputs them to the data memory interface unit 220. The data address signal decoder 214 decodes the data address signal applied through the data memory interface unit 220.

The data memory interface unit 220 includes a data address port unit 221 receiving a data address signal and a data port unit 222 interfacing with the data bus D_BUS and transmitting the execution data stored in the data buffer 213 to the data bus D_BUS.

Figure 4:
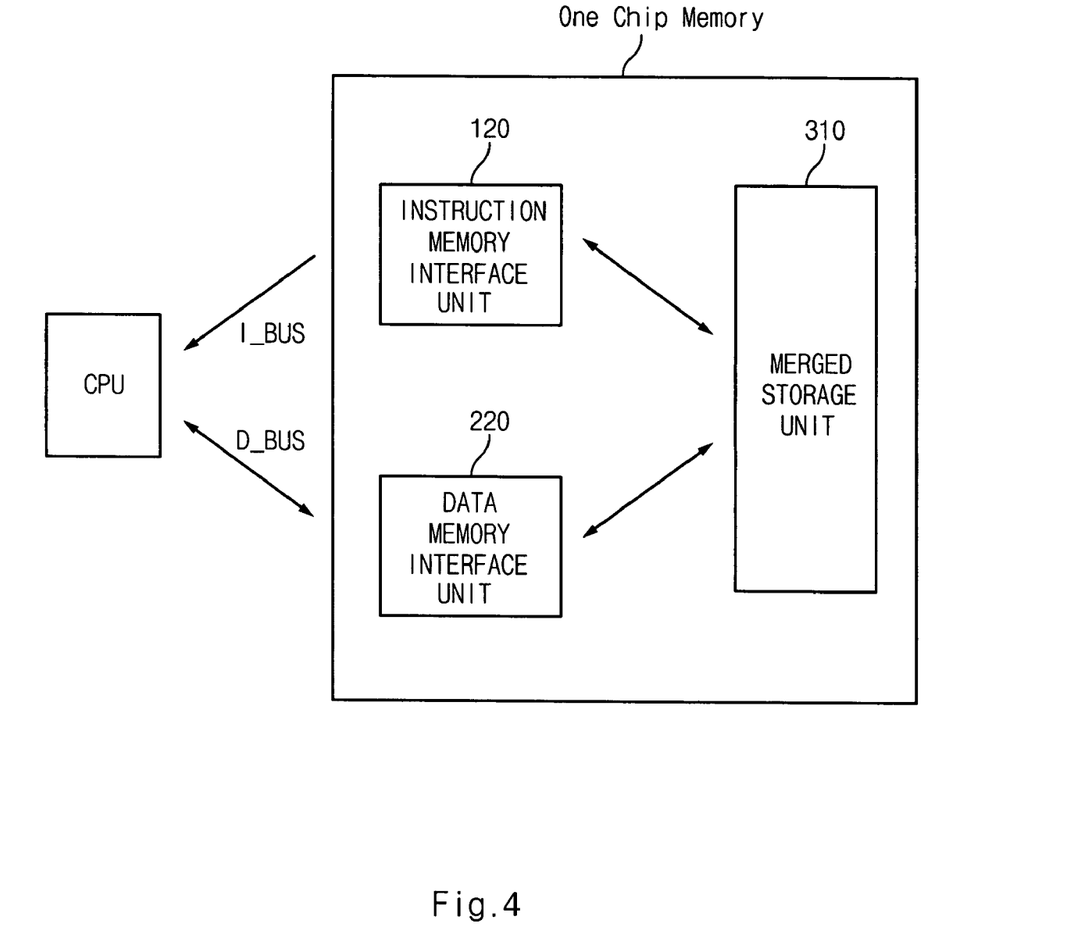
FIG. 4 is a block diagram briefly showing the configuration of a memory apparatus in accordance with a second embodiment of the present invention.

FIG. 4 is a block diagram briefly showing the configuration of a memory apparatus in accordance with a second embodiment of the present invention.

In the memory apparatus of FIG. 4, interface units 120 and 220 are independently provided as shown in FIG. 2, while storage units 110 and 210 are provided in a manner that they merge into one storage unit 310 unlike FIG. 2.

In the present invention, the configuration of the memory apparatus is improved to allow a plurality of memories having different characteristics to be provided in a single memory apparatus, thus the structures of a CPU and buses (an instruction bus I_BUS and a data bus D_BUS) are the same as conventional ones. In the memory apparatus of FIG. 4, even if the storage unit 310 is provided to merge into a single memory, the interface units 120 and 220 should be independently provided so as to correspond to the two buses I_BUS and D_BUS.

Such a memory apparatus of FIG. 4 includes a merged storage unit 310, an instruction memory interface unit 120 and a data memory interface unit 220. The instruction memory interface unit 120 and the data memory interface unit 220 are the same as those shown FIG. 2 in their functions and configurations, so they are given the same reference numerals.

The merged storage unit 310 stores data having different characteristics, i.e., both instruction information and execution data, and the instruction information and execution data are stored separately in different regions of one cell array block. However, when the merged storage unit 310 outputs the stored instruction information or execution data to the CPU, it selectively transmits the corresponding data to the instruction memory interface unit 120 or to the data memory interface unit 220 according to the characteristics of the data to be outputted. And, even in the event that the merged storage unit 310 receives an address signal for read or write operation, it is selectively connected to the instruction memory interface unit 120 or the data memory interface portion 220 according to the characteristics of the data to be read or written and receives the corresponding address signal.

Figure 5:
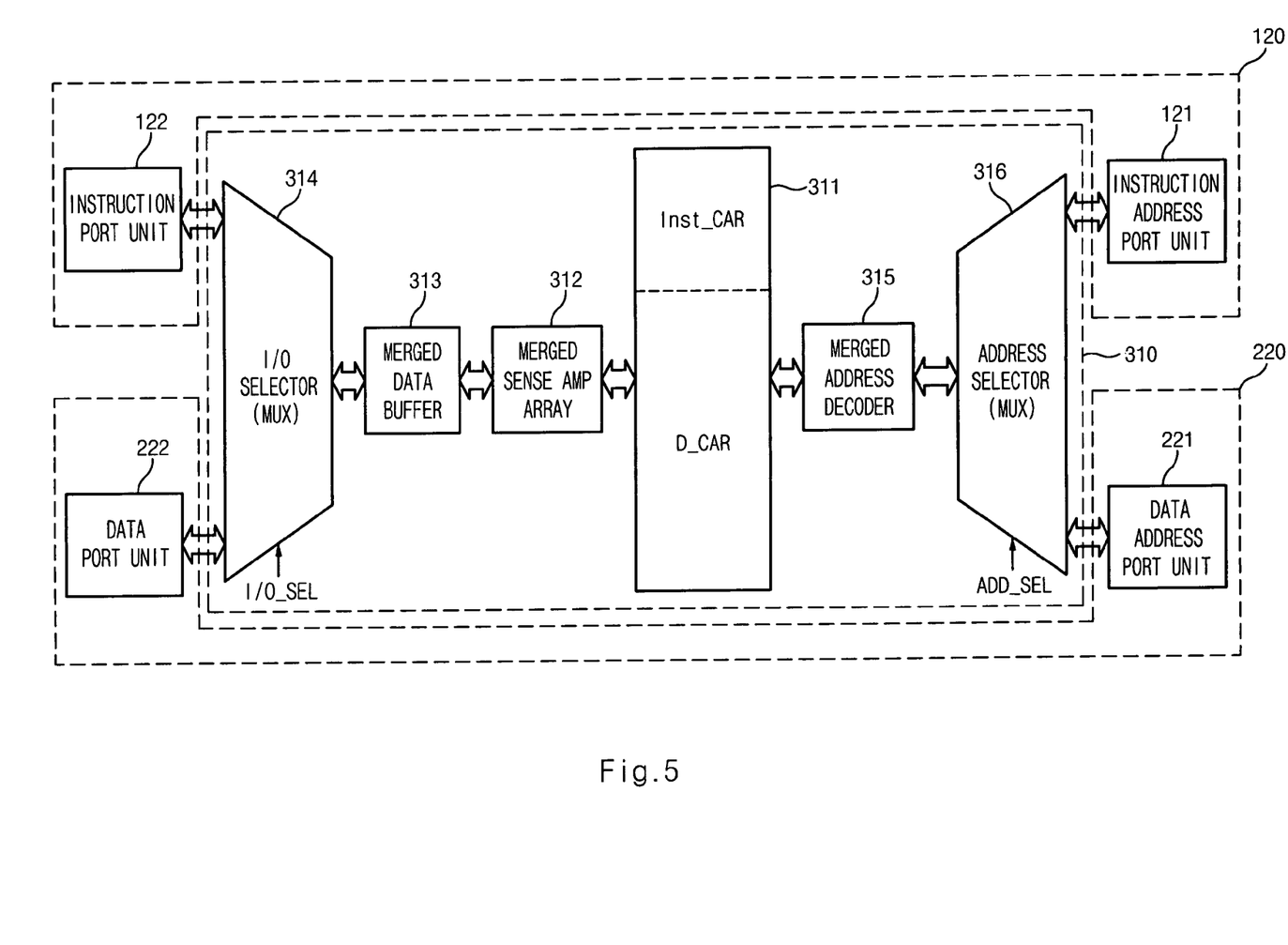
FIG. 5 is a block diagram showing the configuration of the memory apparatus of FIG. 4 in more detail.

FIG. 5 is a block diagram showing the configuration of the memory apparatus of FIG. 4 in more detail.

The merged storage unit 310 includes a merged cell array block 311, a merged sensing amplifier array 312, a merged data buffer 313, an input-output selector 314, a merged address decoder 315 and an address selector 316.

The merged cell array block 311 is divided according to the characteristics of data to be stored in a single cell array region, and divided regions each stores data having different characteristics separately. In FIG. 4, for example, the merged cell array block 311 is divided into an instruction cell array region Inst_CAR storing instruction information and a data cell array region D_CAR storing execution data. At this time, the positions and sizes of the instruction cell array region Inst_CAR and the data cell array region D_CAR are variably changeable.

The merged sensing amplifier array 312 senses and amplifies the data stored in the merged cell array block 311 and outputs them to the merged data buffer 313.

The merged data buffer 313 temporally stores the data sensed in the merged sensing amplifier array 312.

The input-output selector 314 selectively connects the merged data buffer 313 to the instruction memory interface unit 120 or the data memory interface unit 220 according to the characteristics of the data to be inputted and outputted. That is, if the data to be inputted and outputted is instruction information, the input-output selector 314 connects the merged data buffer 313 to the instruction port unit 122 of the instruction memory interface unit 120, or if the data to be inputted and outputted is execution data, the input-output selector 314 connects the merged data buffer 313 to the data port unit 222 of the data memory interface unit 220. At this time, the selection of connection is achieved by an input-output selection signal I/O_SEL. Such an input-output selector 314 is provided with a multiplexer MUX for selectively connecting the merged data buffer 313 to the instruction port unit 122 or the data port unit 222 according to the input-output selection signal I/O_SEL.

The merged address decoder 315 properly decodes an applied address signal according to the positions of the instruction cell array region Inst_CAR and data cell array region D_CAR and enables the data consistent with the characteristics of the corresponding regions to be stored in the respective cell array regions Inst_CAR and D_CAR.

The address selector 316 selectively connects the merged address decoder unit 315 to the instruction memory interface unit 120 or the data memory interface unit 220 according to the characteristics of the data to be inputted and outputted when an address signal is applied. That is, if the data to be inputted and outputted is instruction information, the address selector 316 connects the merged address decoder 315 to the instruction address port unit 121 of the instruction memory interface unit 120, or if the data to be inputted and outputted is execution data, the address selector 316 connects the merged address decoder unit 315 to the data address port unit 221 of the data memory interface unit 220.

At this time, the selection of connection is achieved by an address selection signal ADD_SEL. Such an address selector 316 is provided with a multiplexer MUX for selectively connecting the merged address decoder 315 to the instruction address port unit 121 or the data address port unit 221 according to the address selection signal ADD_SEL.

The memory apparatus shown in FIG. 5 can increase the efficiency of use of the memories since it is merged with the storage unit 310.

Figure 6:
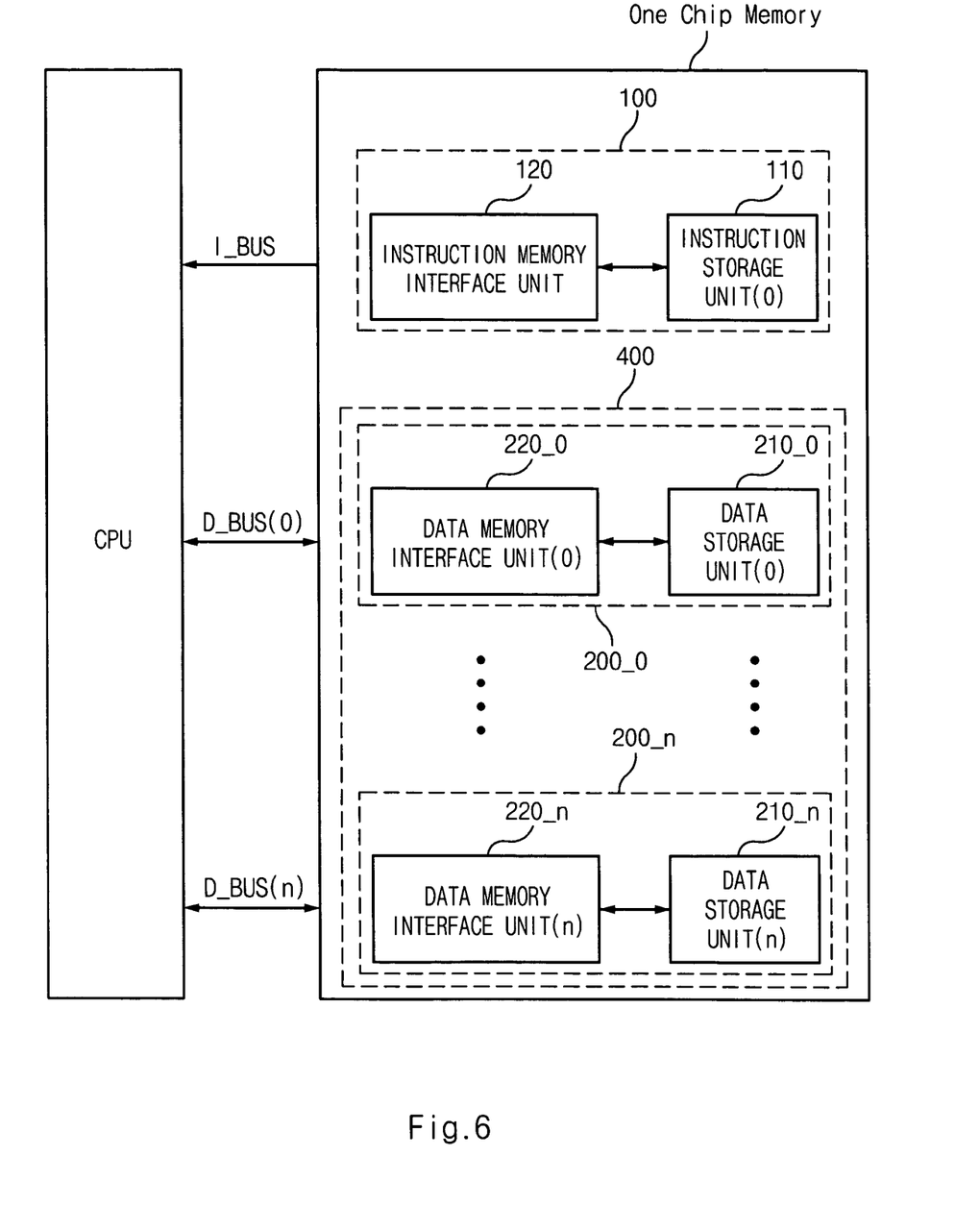
FIG. 6 is a block diagram briefly showing the configuration of a memory apparatus in accordance with a third embodiment of the present invention.

FIG. 6 is a block diagram briefly showing the configuration of a memory apparatus in accordance with a third embodiment of the present invention.

The memory apparatus of FIG. 6 is a memory apparatus having a multi-port structure of three or more ports, and includes an instruction memory unit 100 and a data memory unit array 400. The data memory unit array 400 is provided with a plurality of data memory units 200_0 to 200_n corresponding to data buses D_BUS(0) to D_BUS(n) one by one. That is, three or more memory units corresponding to a CPU are all provided in one memory apparatus, and the memory units 100 and 200_0 to 200_n correspond to the CPU independently.

Figure 7:
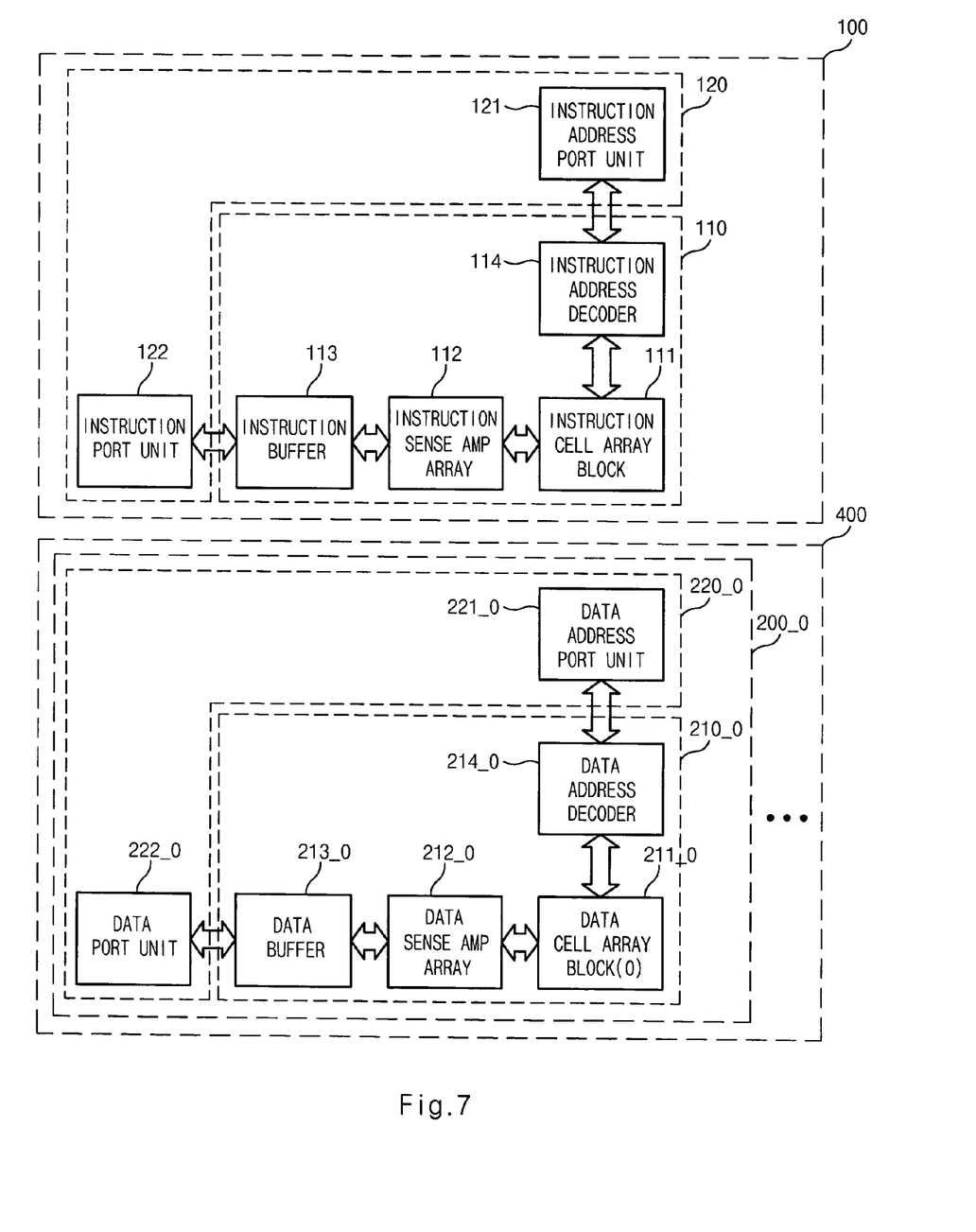
FIG. 7 is a block diagram showing the configuration of the memory apparatus of FIG. 6 in more detail.

FIG. 7 is a block diagram showing the configuration of the memory apparatus of FIG. 6 in more detail.

The memory apparatus of FIG. 7 is provided with one instruction memory unit 100 and a plurality of data memory units 200_0 to 200_n independently.

The configuration and operation of the respective memory units 100 and 200_0 to 200_n are the same as those shown in FIG. 3, and a description thereof will be omitted.

Figure 8:
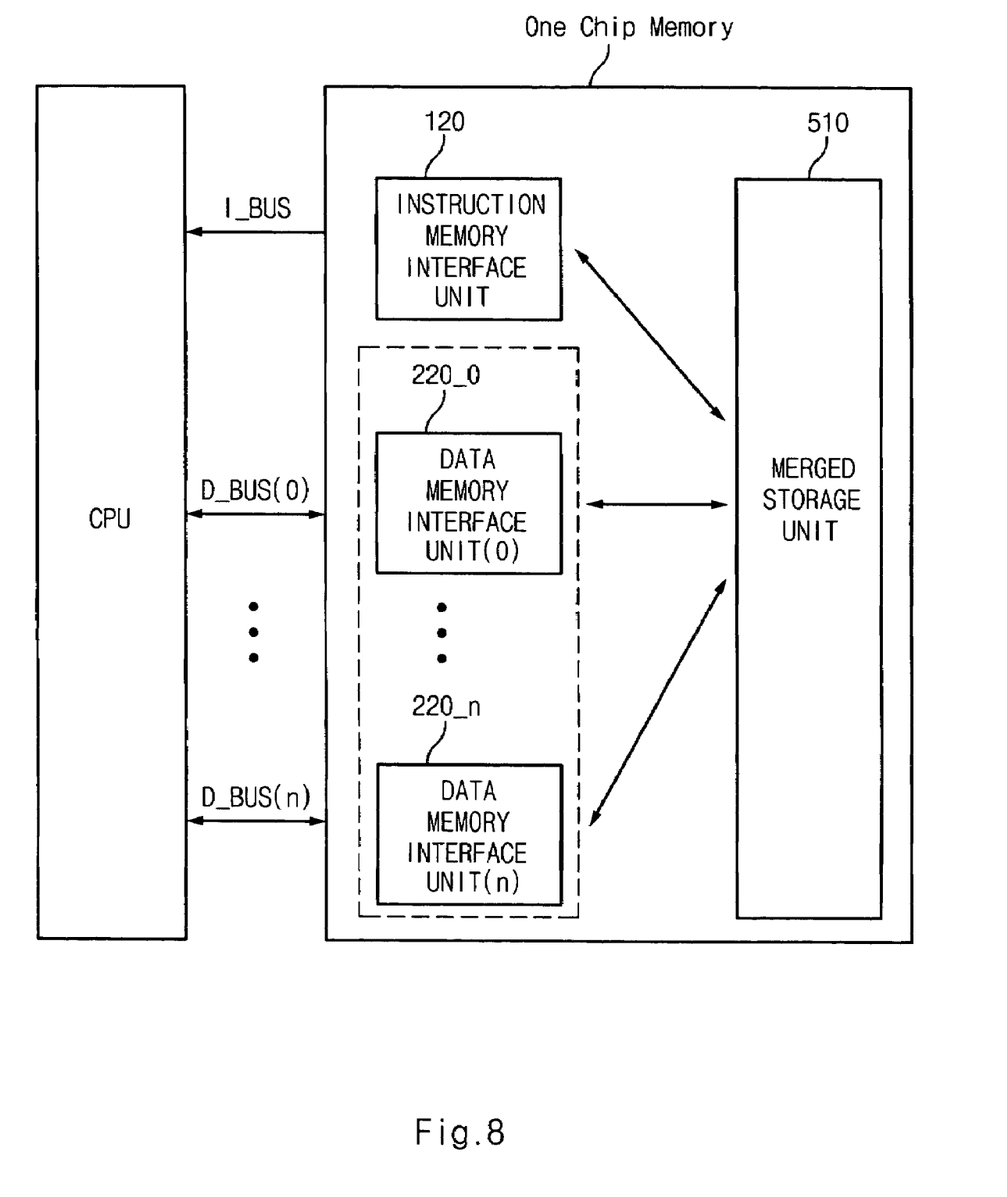
FIG. 8 is a block diagram briefly showing the configuration of a memory apparatus in accordance with a fourth embodiment of the present invention.

FIG. 8 is a block diagram briefly showing the configuration of a memory apparatus in accordance with a fourth embodiment of the present invention.

In the memory apparatus of FIG. 8, respective interface units 120 and 220_0 to 220_n are independently provided as shown in FIG. 6, while an instruction storage unit 110 and data storage units 210_0 to 210_n merge into one storage unit 510 unlike FIG. 6.

Such a memory apparatus of FIG. 8 includes a merged storage unit 510, an instruction memory interface unit 120 and a plurality of data memory interface units 220_0 to 220_n. The instruction memory interface unit 120 and the data memory interface units 220_0 to 220_n are the same as those shown FIG. 6 in their functions and configurations, so they are given the same reference numerals.

The merged storage unit 510 stores a plurality of data having different characteristics, i.e., instruction information, and a plurality of execution data having different characteristics separately in one cell array block. However, when the merged storage unit 510 outputs the stored instruction information or execution data to the CPU, it selectively transmits the corresponding data to the instruction memory interface unit 120 or one of the plurality of data memory interface units 220_0 to 220_n according to the characteristics of the data to be outputted. And, even in the event that the merged storage unit 510 receives an address signal for read or write operation, it is selectively connected to the instruction memory interface unit 120 or one of the plurality of data memory interface portion 220_0 to 220_n according to the characteristics of the data to be read and written and receives the corresponding address signal.

Figure 9:
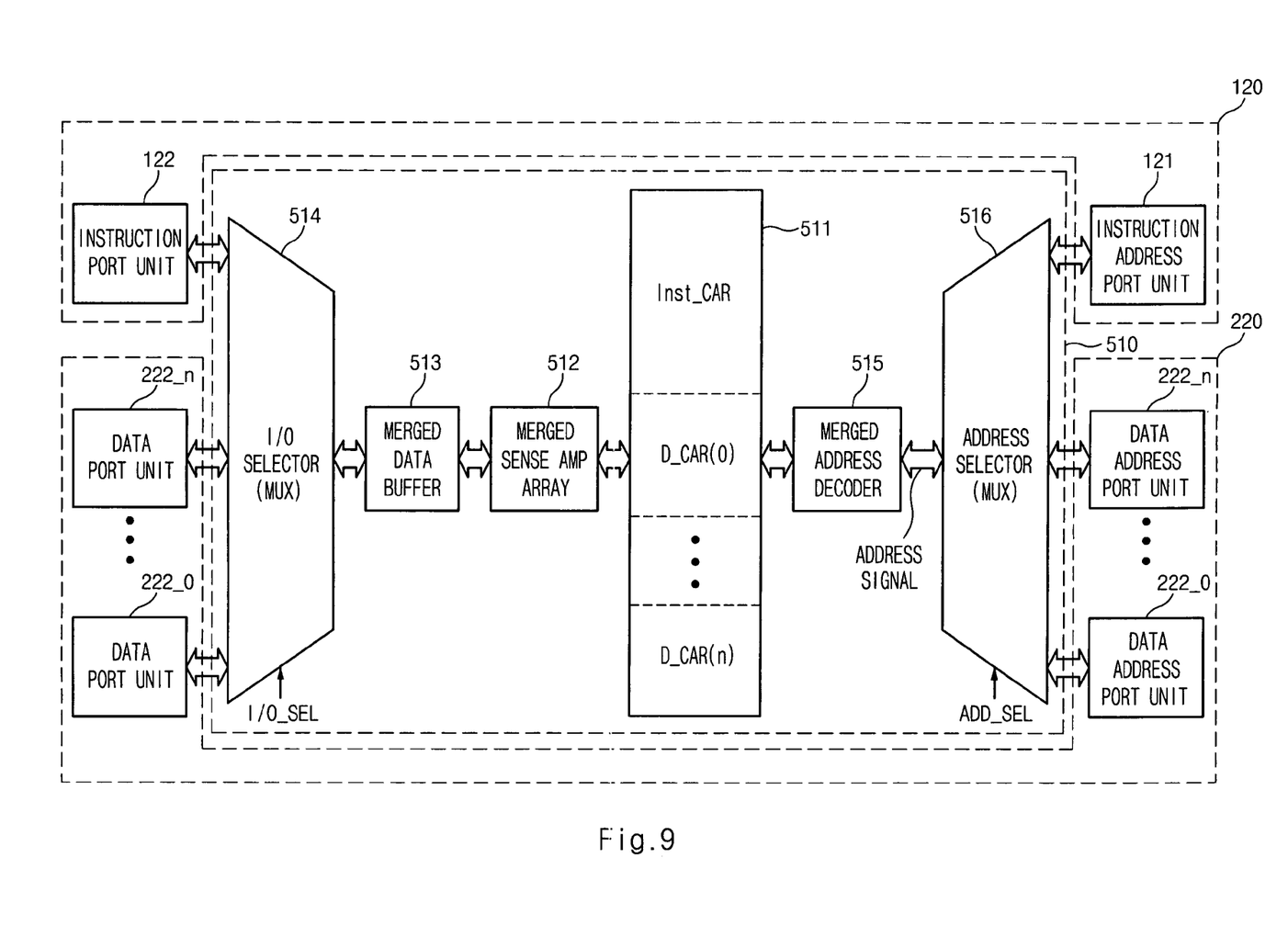
FIG. 9 is a block diagram showing the configuration of the memory apparatus of FIG. 8 in more detail.

FIG. 9 is a block diagram showing the configuration of the memory apparatus of FIG. 8 in more detail.

The merged storage unit 510 includes a merged cell array block 511, a merged sensing amplifier array 512, a merged data buffer 513, an input-output selector 514, a merged address decoder 515 and an address selector 516.

The merged cell array block 511 is divided according to the characteristics of data to be stored in a single cell array region, and divided regions each stores data having different characteristics separately. In FIG. 9, for example, the merged cell array block 511 is divided into one instruction cell array region Inst_CAR storing instruction information and a plurality of data cell array regions D_CAR(0) to D_CAR(n) storing execution data having difference characteristics. At this time, the positions and sizes of the instruction cell array region Inst_CAR and the data cell array regions D_CAR(0) to D_CAR(n) are variably changeable.

Besides, the functions of other components 312 to 315 are the same as those of the corresponding components of FIG. 5, so a description thereof will be omitted.

Figure 10:
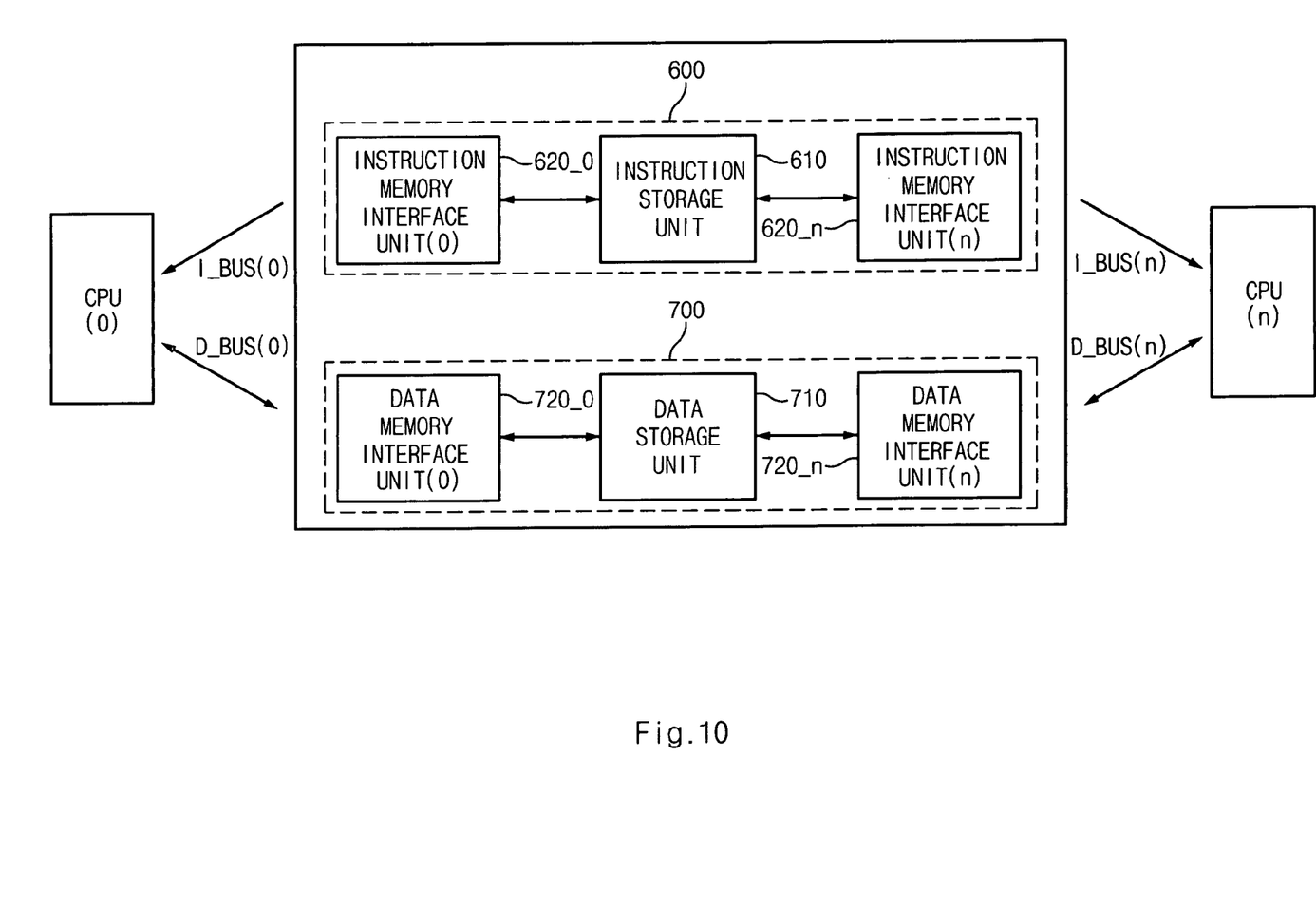
FIG. 10 is a block diagram briefly showing the configuration of a memory apparatus in accordance with a fifth embodiment of the present invention.

FIG. 10 is a block diagram briefly showing the configuration of a memory apparatus in accordance with a fifth embodiment of the present invention.

FIG. 10 shows the configuration of a memory apparatus corresponding to a system having not one CPU but a plurality of CPUs, i.e., multi-CPUs.

The memory apparatus of FIG. 10 includes an instruction memory unit 600 and a data memory unit 700.

The instruction memory unit 600 selectively receives an address signal from multiple CPUs through multiple instruction memory interface units 620. And, the instruction memory unit 600 selectively transmits instruction information stored in an instruction storage unit 610 to the multiple CPUs through the multiple instruction memory interface units 620 according to the received address signal.

The data memory unit 700 selectively receives address signals from multiple CPUs through multiple data memory interface units 720. And, the data memory unit 700 selectively transmits execution information stored in a data storage unit 710 to the multiple CPUs through the multiple data memory interface unit 720 according to the received address signal.

Figure 11:
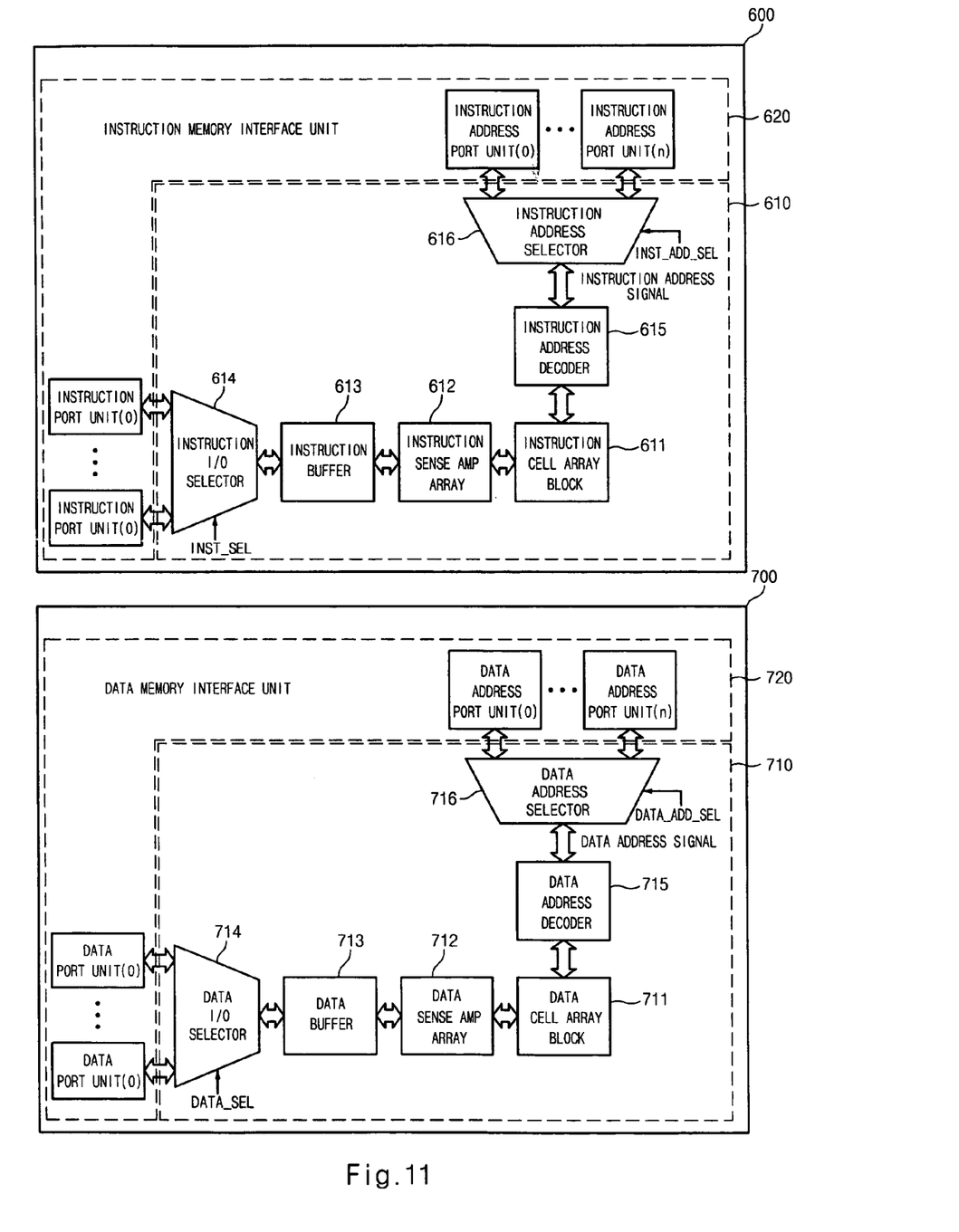
FIG. 11 is a block diagram showing the configuration of the memory apparatus of FIG. 10 in more detail.

FIG. 11 is a block diagram showing the configuration of the memory apparatus of FIG. 10 in more detail.

The instruction storage unit 610 includes an instruction cell array block 611, an instruction sensing amplifier array 612, an instruction buffer 613, an instruction input-output selector 614, an instruction address decoder 615 and an instruction address selector 616.

The instruction cell array block 611 is provided with cell arrays having nonvolatile ferroelectric capacitors and stores instruction information for the execution of the operation of the CPUs. The instruction sensing amplifier array 612 senses and amplifies the instruction information stored in the instruction cell array block 611 and outputs them to the instruction buffer 613. The instruction buffer 613 temporally stores the instruction information sensed in the instruction sensing amplifier array 612 and then outputs the stored instruction information to instruction memory interface unit 620 through the instruction input-output selector 614. The instruction input-output selector 614 selectively connects the instruction buffer 613 to the instruction port units of the instruction memory interface unit 620 according to an instruction input-output selection signal INST_SEL. The instruction address decoder 615 decodes the instruction address signal selectively applied from the instruction memory interface units 620through the instruction address selector 616. The instruction address selector 616 selectively connects the instruction address decoder 615 to the instruction address port units of instruction memory interface unit 620 according to an instruction address selection signal INST_ADD_SEL.

The instruction memory interface unit 620 connects between the plurality of CPUs and the one instruction storage unit 610. That is, the instruction memory interface unit 620 is provided with instruction address port units for receiving an instruction address signal from the corresponding CPU and instruction port units for transmitting the instruction information stored in the instruction storage unit 610 to the corresponding CPU.

The data storage unit 710 includes a data cell array block 711, a data sensing amplifier array 712, a data buffer 713, a data input-output selector 714, a data address decoder 715 and a data address selector 716.

The data cell array block 711 is provided with cell arrays and stores the execution data required for the execution of an instruction of the instruction storage unit 610. The data sensing amplifier array 712 senses and amplifies the execution data stored in the data cell array block 711 and outputs them to the data buffer 713. The data buffer 713 temporally stores the execution data sensed in the data sensing amplifier array 712 and then outputs them to one of the data ports of the plurality of data memory interface unit 720 through the data input-output selector 714. The data input-output selector 714 selectively connects the instruction buffer 713 to the data port units of the plurality of data memory interface units 720 according to a data input-output selection signal DATA_SEL. The instruction address signal decoder 715 decodes the data address signal selectively applied from the instruction memory interface unit 720 through the data address selector 716. The data address selector 716 selectively connects the data address decoder 715 to the data address port units of the of data memory interface unit 720 according to a data address selection signal DATA_ADD_SEL.

The data memory interface unit 720 connects between the plurality of CPUs and the one data storage unit 710. That is, the data memory interface unit 720 is provided with data address port units for receiving a data address signal from the corresponding CPU and data port units for transmitting the instruction information stored in the data storage unit 710 to the corresponding CPU.

Figure 12:
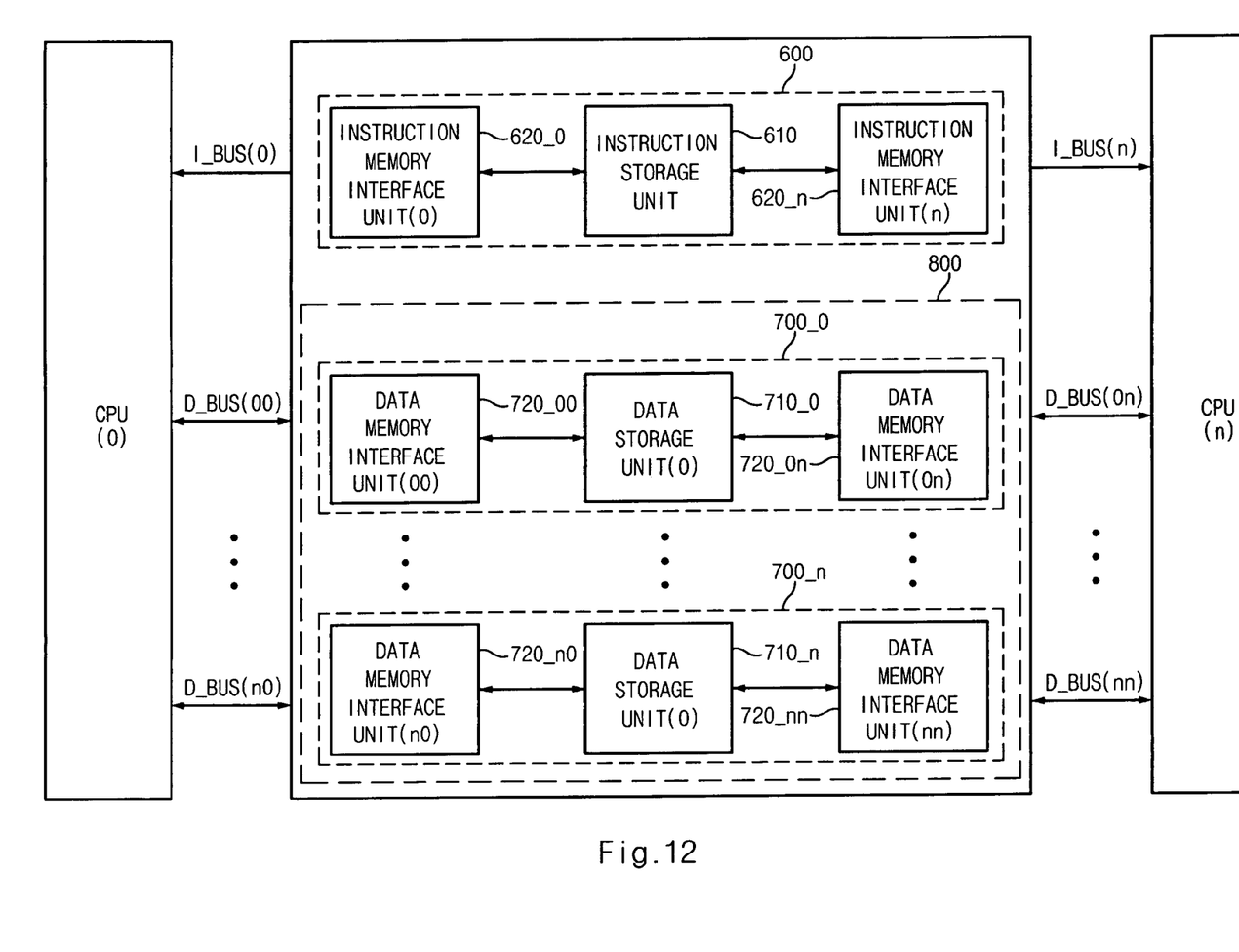
FIG. 12 is a block diagram briefly showing the configuration of a memory apparatus in accordance with a sixth embodiment of the present invention.

FIG. 12 is a block diagram briefly showing the configuration of a memory apparatus in accordance with a sixth embodiment of the present invention.

The memory apparatus of FIG. 12 shows the structure of the memory apparatus corresponding to a system connected to each of multiple CPUs and multi-ports comprising three or more ports. The memory apparatus of FIG. 12 includes an instruction memory unit 600 and a data memory unit array 800. In FIG. 12, the data memory unit array 800 is provided with a plurality of data memory units 700_0 to 700_n, each of the data memory units 700_0 to 700_n has a structure in which a plurality of data memory interface units 720_00 to 720_0n and 720_n0 to 720_nn correspond to one data storage unit 710_0 to 710_n. The configuration of each of the data memory units 700_0 to 700_n is the same as the data memory unit 700 of FIG. 11.

Further, in the present invention, the storage units independently provided as shown in FIGS. 10 and 12 can be selectively connected to the plurality of instruction interface units and the plurality of data memory interface units after they are provided so as to merge into a single one as shown in FIG. 5 or FIG. 9.

Figure 13:
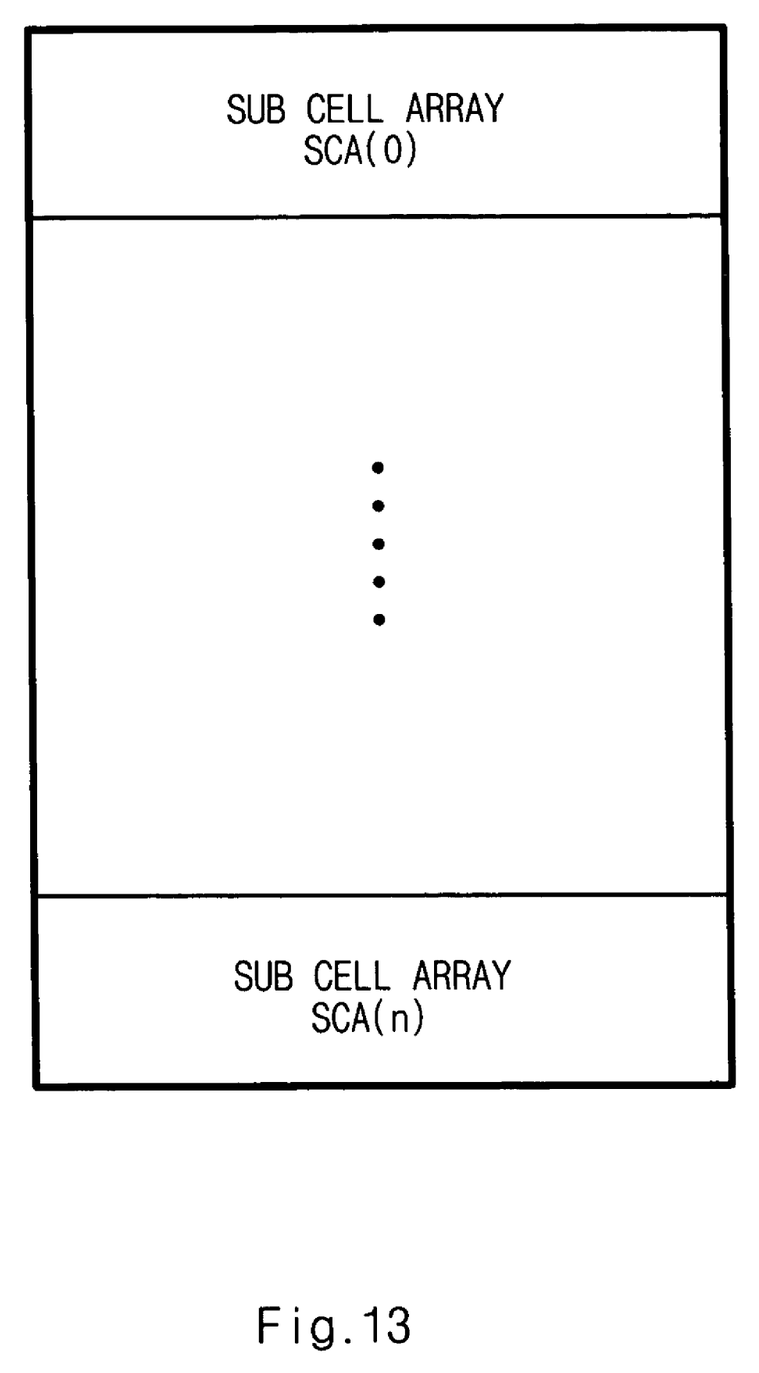
FIG. 13 is a block diagram briefly showing the configuration of cell array blocks in accordance with the first embodiment of the present invention.

FIG. 13 is a block diagram briefly showing the configuration of cell array blocks 111 to 711 used in accordance with the first embodiment of the present invention.

In the present invention, the cell array blocks 111 to 711 are constructed of nonvolatile memory cells using nonvolatile ferroelectric capacitors so as to overcome the volatile characteristic of a conventional memory. The cell array blocks 111 to 711 of the present invention are each provided with a plurality of sub cell arrays SCA(0) to SCA(n), and have a hierarchical bit line architecture in which a plurality of sub bit lines are selectively connected to one main bit line.

Figure 14:
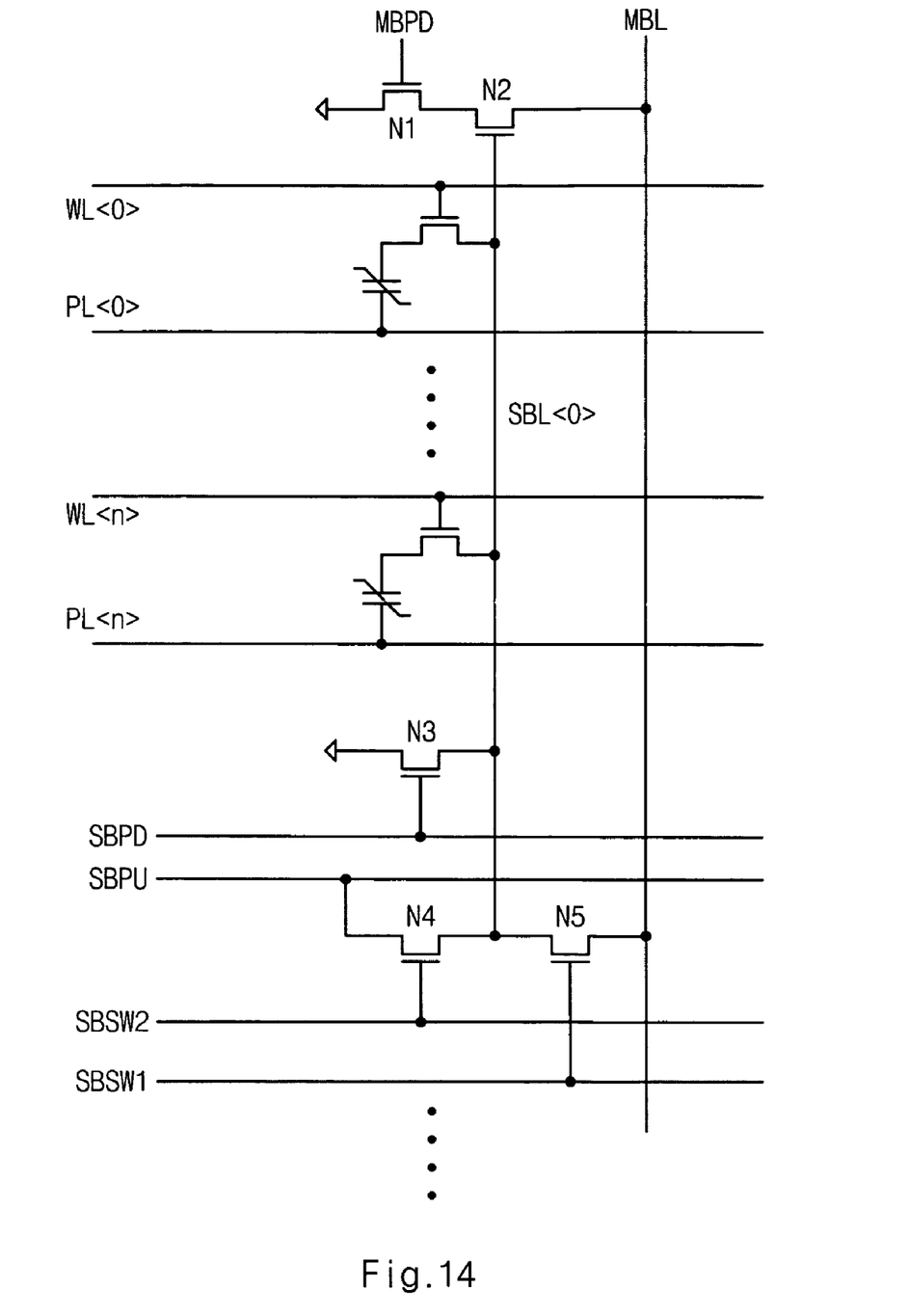
FIG. 14 is a circuit diagram showing the configuration of one of sub cell arrays of FIG. 13 in more detail.

FIG. 14 is a circuit diagram showing the configuration of one SCA(0) of sub cell arrays SCA(0) to SCA(n) of FIG. 13 in more detail.

One main bit line MBL corresponds to a plurality of sub bit lines SBL, and is selectively connected to one sub bit line SBL for each read/write operation. FIG. 14 shows the relationship of connection between a main bit line MBL and a sub bit line SBL<0> of a sub cell array SCA(0).

Here, if a sub bit line selection signal SBSW1 is activated, a corresponding NMOS transistor N5 is turned on. Then, the load of the main bit line MBL is at the level of one sub bit line. Further, as a sub bit line pulldown signal SBPD is activated, a NMOS transistor N3 is turned on to control the sub bit line SBL<0> to an earth voltage level.

A sub bit line pullup signal SBPU is a signal for adjusting a power to be supplied to the sub bitline SBL<0>, and a sub bit line selection signal SBSW2 is a signal for controlling the sub bit line pullup signal SBPU to be applied to the sub bit line SBL<0>. For example, if it is desired to generate a high voltage to the sub bit line SBL<0>, a voltage higher than a source voltage VCC is supplied as the sub bit line pullup signal SBPU and the sub bit line selection signal SBSW2 is activated. When a NMOS transistor N4 is turned on by the activation of the sub bit line selection signal SBSW2, a high voltage is supplied to the sub bit line SBL<0>.

And, a plurality of unit cells having nonvolatile ferroelectric capacitors is connected to the sub bit line SBL<0>.

A NMOS transistor N1 is connected between a ground voltage end and a NMOS transistor N2 and a gate terminal receiving the main bit line pulldown signal MBPD. The NMOS transistor N2 is connected between the NMOS transistor N1 and the main bit line MBL and its gate terminal is connected to the sub bit line SBL<0>. When a bit line pulldown signal MBPD is activated, the channel resistance of the NMOS transistor N2 is changed according to a sensing voltage of the sub bit line SBL<0> to thus change the size of the voltage induced to the main bit line MBL. For example, if cell data is high, the voltage of the sub bit line SBL<0> becomes larger. Due to this, the amount of current flowing through the NMOS transistor N2 becomes larger to thus greatly drop down the voltage level of the main bit line MBL. On the contrary, if cell data is low, the voltage of the sub bit line SBL<0> becomes smaller. Due to this, the amount of current flowing through the NMOS transistor becomes smaller to thus slightly drop down the voltage level of the main bit line MBL. As described above, if a level difference in sensing voltage occurs in the main bit line MBL according to cell data, the data of a selected cell can be sensed by using the above level difference.

As seen from above, the memory apparatus having multi-ports of the present invention can prevent the increase of the area of a system board and the decrease of a delay margin on a data bus to enhance the performance of the system by improving the structure of the memory apparatus so as to store data having difference characteristics in one memory apparatus and use them.

What is claimed is:

1. A memory apparatus for supporting a multiprocessor function, comprising:

a first interface unit connected to a central processing unit of a system by an instruction bus and for inputting and outputting an instruction information required for the operation of the central processing unit and an instruction address signal;

at least one second interface unit connected to the central processing unit of the system by a data bus and for inputting and outputting an execution data required for the execution of the instruction information and a data address signal; and a merged storage unit storing the instruction information and the execution data separately in the same cell array block and being selectively connected to either the first interface unit or the second interface unit according to the characteristics of a stored data for reading/writing the instruction information and the execution data, the first interface unit, the second interface unit and the merged storage unit all being included in one memory chip.

2. The memory apparatus of claim 1, wherein the merged storage unit comprises:

a cell array block comprised of unit cells having nonvolatile ferroelectric capacitors and storing the instruction information and the execution data separately in different regions a merged sensing amplifier array unit sensing the instruction information or execution data corresponding to an applied address signal upon data reading;

a merged data buffer unit temporally storing the read data sensed in the merged sensing amplifier array unit and the execution data applied through the second interface units;

an input-output selector selectively connecting either the first interface unit or the second interface unit to the merged data buffer unit according to a data selection signal and transmitting data;

a merged address decoder unit decoding an applied address signal and designating the position of the instruction information or execution data in the cell array blocks; and an address selector selectively connecting either the first interface unit or the second interface unit to the merged address decoder unit according to an address selection signal and transmitting the address signal.

3. The memory apparatus of claim 2, wherein the cell array block has a hierarchical bit line architecture in which a plurality of sub bit lines, each connected to a cell array block, are selectively connected to one main bit line and a voltage of the main bit line is changed according to a level of a voltage induced to the sub bit lines by cell data, thereby sensing the cell data.

* * * * *